United States Patent
Sundaram et al.

(12)

(10) Patent No.: US 10,046,762 B2
(45) Date of Patent: Aug. 14, 2018

(54) TRAJECTORY INTEGRITY CO-PILOT FOR AUTONOMOUS VEHICLE

(71) Applicant: GM GLOBAL TECHNOLOGY OPERATIONS LLC, Detroit, MI (US)

(72) Inventors: Padma Sundaram, West Bloomfield, MI (US); Keun Jae Kim, Novi, MI (US); Brian N. Siskoy, Berkley, MI (US); Andrew H. Leutheuser, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 127 days.

(21) Appl. No.: 15/240,106

(22) Filed: Aug. 18, 2016

(65) Prior Publication Data
US 2018/0050695 A1 Feb. 22, 2018

(51) Int. Cl.
| | |
|---|---|
| *B60W 10/10* | (2012.01) |
| *B60W 30/10* | (2006.01) |
| *B60W 10/06* | (2006.01) |
| *B60W 10/18* | (2012.01) |
| *B60W 10/20* | (2006.01) |

(52) U.S. Cl.
CPC ............ *B60W 30/10* (2013.01); *B60W 10/06* (2013.01); *B60W 10/10* (2013.01); *B60W 10/18* (2013.01); *B60W 10/20* (2013.01); *B60W 2520/06* (2013.01); *B60W 2710/0605* (2013.01); *B60W 2710/10* (2013.01); *B60W 2710/18* (2013.01); *B60W 2710/20* (2013.01); *B60W 2720/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 2016/0052547 | A1* | 2/2016 | Kashiwai | B60W 30/10 701/41 |
| 2016/0368491 | A1* | 12/2016 | Hauler | B60T 7/22 |

* cited by examiner

*Primary Examiner* — Anne M Antonucci
*Assistant Examiner* — Renee LaRose (57) ABSTRACT

An automotive vehicle includes a vehicle steering system, an actuator configured to control the steering system, a first controller, and a second controller. The first controller is in communication with the actuator. The first controller is configured to communicate an actuator control signal based on a primary automated driving system control algorithm. The second controller is in communication with the actuator and with the first controller. The second controller is configured to, in response to a first predicted vehicle path based on the actuator control signal deviating from a desired route by a threshold distance, control the actuator to maintain a current actuator setting. The second controller is also configured to, in response to the first predicted vehicle path not deviating from the desired route by the threshold distance, control the actuator according to the actuator control signal.

13 Claims, 3 Drawing Sheets

TRAJECTORY INTEGRITY CO-PILOT FOR AUTONOMOUS VEHICLE

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes a vehicle steering system, an actuator configured to control the steering system, a first controller, and a second controller. The first controller is in communication with the actuator. The first controller is provided with a primary automated driving system control algorithm and is configured to communicate an actuator control signal based on the primary automated driving system control algorithm. The second controller is in communication with the actuator and with the first controller. The second controller is configured to, in response to a first predicted vehicle path based on the actuator control signal deviating from a desired route by a threshold distance, control the actuator to maintain a current actuator setting. The second controller is also configured to, in response to the first predicted vehicle path not deviating from the desired route by the threshold distance, control the actuator according to the actuator control signal.

According to at least one embodiment, the second controller is further configured to, in response to a second predicted vehicle path based on the current actuator setting deviating from the desired route by the threshold distance, control the actuator based on a fallback command. In such embodiments, the second controller may be configured to predict a first perpendicular distance between the desired route and the first predicted vehicle path and to predict a second perpendicular distance between the desired route and the second predicted vehicle path.

According to at least one embodiment, the second controller is configured to predict the first vehicle path based on the actuator control signal in response to the actuator control signal.

According to at least one embodiment, the first controller is associated with a first CPU and the second controller is associated with a second CPU.

According to at least one embodiment, the vehicle further includes a second actuator configured to control a vehicle throttle, a third actuator configured to control vehicle brakes, and a fourth actuator configured to control vehicle shifting. In such embodiments, the controller is additionally in communication with the second actuator, third actuator, and fourth actuator.

A method of controlling a vehicle according to the present disclosure includes providing the vehicle with an actuator configured to control vehicle steering, throttle, braking, or shifting. The method also includes providing the vehicle with a first controller in communication with the actuator and having a primary automated driving system control algorithm. The method additionally includes providing the vehicle with a second controller in communication with the actuator and the first controller. The method further includes communicating, from the first controller, an actuator control signal based on the primary automated driving system control algorithm. The method further includes, in response to a first predicted vehicle path based on the actuator control signal deviating from a desired route by a threshold distance, controlling, by the second controller, the actuator to maintain a current actuator setting.

According to at least one embodiment, the method additionally includes, in response to the first predicted vehicle path not deviating from the desired route by the threshold distance, controlling the actuator based on the actuator control signal.

According to at least one embodiment, the method additionally includes, in response to a second predicted vehicle path based on the current actuator setting deviating from the desired route by the threshold distance, controlling the actuator based on a fallback command.

According to at least one embodiment, the method additionally includes predicting, by the second controller, a first perpendicular distance between the desired route and the first predicted vehicle path, and predicting, by the second controller, a second perpendicular distance between the desired route and the second predicted vehicle path.

A system for autonomous control of a vehicle according to the present disclosure includes an actuator, a first controller, and a second controller. The actuator is configured to control vehicle steering, throttle, braking, or shifting. The first controller is in communication with the actuator, and is configured to communicate an actuator control signal based on a primary automated driving system control algorithm. The second controller is in communication with the actuator and with the first controller. The second controller being configured to, in response to a first predicted vehicle path based on the actuator control signal deviating from a desired route by a threshold distance, control the actuator to maintain a current actuator setting.

According to at least one embodiment, the second controller is further configured to, in response to a second predicted vehicle path based on the current actuator setting deviating from the desired route by the threshold distance, control the actuator based on a fallback command. In such embodiments, the second controller may be configured to predict a first perpendicular distance between the desired route and the first predicted vehicle path and to predict a second perpendicular distance between the desired route and the second predicted vehicle path.

According to at least one embodiment, the second controller is configured to predict the first vehicle path based on the actuator control signal in response to the actuator control signal.

According to at least one embodiment, the first controller is associated with a first CPU and the second controller is associated with a second CPU.

According to at least one embodiment, the actuator is configured to control vehicle steering. In such embodiments, the system further includes a second actuator configured to control a vehicle throttle, a third actuator configured to control vehicle brakes, and a fourth actuator configured to control vehicle shifting. In such embodiments, the controller is additionally in communication with the second actuator, third actuator, and fourth actuator.

Embodiments according to the present disclosure provide a number of advantages. For example, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
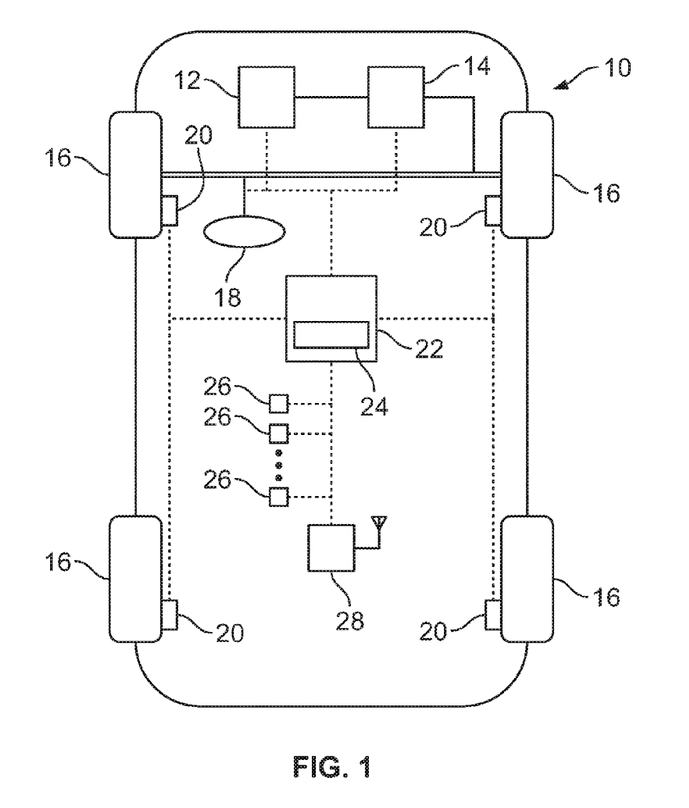
FIG. 1 is a schematic representation of a vehicle according to the present disclosure.

Referring now to FIG. 1, an automotive vehicle 10 according to the present disclosure is shown in schematic form. The automotive vehicle 10 includes a propulsion system 12, which may in various embodiments include an internal combustion engine, an electric machine such as a traction motor, and/or a fuel cell propulsion system.

The automotive vehicle 10 also includes a transmission 14 configured to transmit power from the propulsion system 12 to vehicle wheels 16 according to selectable speed ratios. According to various embodiments, the transmission 14 may include a step-ratio automatic transmission, a continuously-variable transmission, or other appropriate transmission.

The automotive vehicle 10 additionally includes a steering system 18. While depicted as including a steering wheel for illustrative purposes, in some embodiments contemplated within the scope of the present disclosure, the steering system 18 may not include a steering wheel.

The automotive vehicle 10 additionally includes a plurality of vehicle wheels 16 and associated wheel brakes 20 configured to provide braking torque to the vehicle wheels 16. The wheel brakes 20 may, in various embodiments, include friction brakes, a regenerative braking system such as an electric machine, and/or other appropriate braking systems.

The propulsion system 12, transmission 14, steering system 18, and wheel brakes 20 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 is provided with an automated driving system (ADS) 24 for automatically controlling various actuators in the vehicle 10. In an exemplary embodiment, the ADS 24 is configured to control the propulsion system 12, transmission 14, steering system 18, and wheel brakes 20 to control vehicle acceleration, steering, and braking, respectively, without human intervention.

The ADS 24 is configured to control the propulsion system 12, transmission 14, steering system 18, and wheel brakes 20 in response to inputs from a plurality of sensors 26, which may include GPS, RADAR, LIDAR, optical cameras, thermal cameras, ultrasonic sensors, and/or additional sensors as appropriate.

The vehicle 10 additionally includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, additional or alternate wireless communications standards, such as IEEE 802.11 and cellular data communication, are also considered within the scope of the present disclosure.

In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

Figure 2:
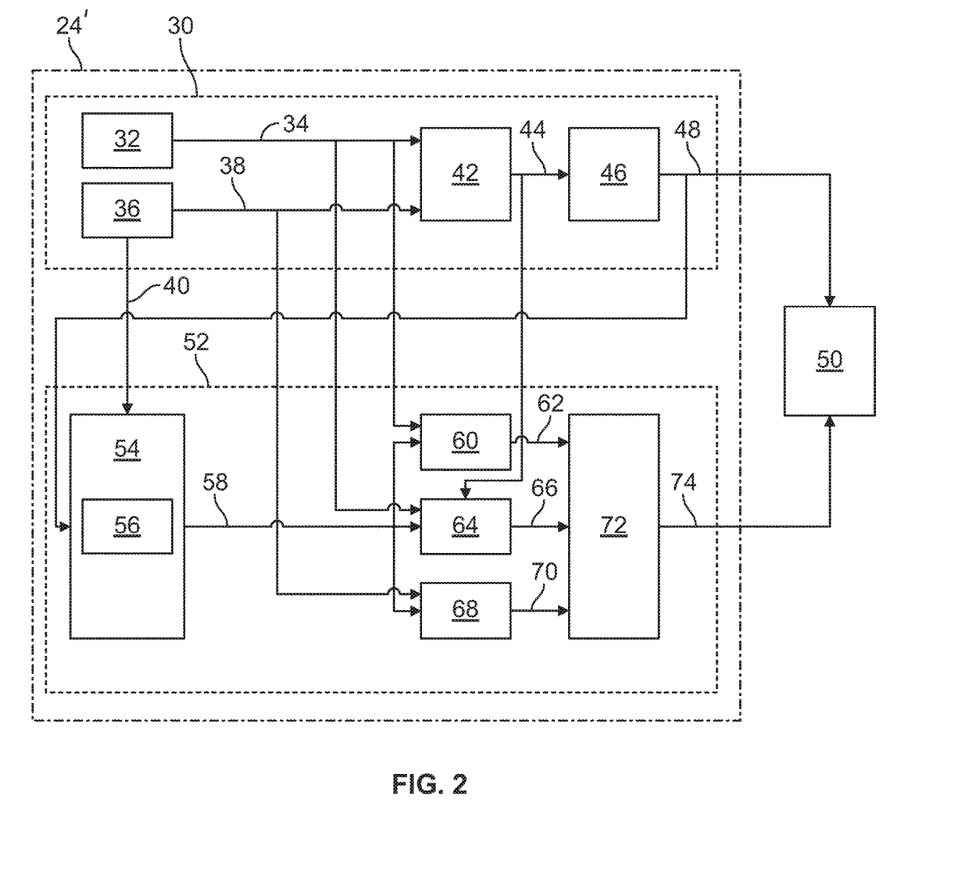
FIG. 2 is a schematic representation of a first embodiment of a system for controlling a vehicle according to the present disclosure.

Referring now to FIG. 2, an exemplary architecture for an ADS 24' according to the present disclosure is illustrated. The ADS 24' may be provided via one or more controllers as illustrated in FIG. 1 and discussed in further detail below.

The ADS 24' includes multiple distinct control systems, as will be discussed in further detail below. Among the multiple distinct control systems is at least one primary control system 30.

The primary control system 30 includes a sensor fusion module 32 for determining the presence, location, and path of detected features in the vicinity of the vehicle. The sensor fusion module 32 is configured to receive inputs from a variety of sensors, such as the sensors 26 illustrated in FIG. 1. The sensor fusion module 32 processes and synthesizes the inputs from the variety of sensors and generates a sensor fusion output 34. The sensor fusion output 34 includes various calculated parameters including, but not limited to, a location of a detected obstacle relative to the vehicle, a predicted path of the detected obstacle relative to the vehicle, and a location and orientation of traffic lanes relative to the vehicle.

The primary control system 30 also includes a mapping and localization module 36 for determining the location of the vehicle and route for a current drive cycle. The mapping and localization module 36 is also configured to receive inputs from a variety of sensors, such as the sensors 26 illustrated in FIG. 1. The mapping and localization module 36 processes and synthesizes the inputs from the variety of sensors, and generates a mapping and localization output 38. The mapping and localization output 38 includes various calculated parameters including, but not limited to, a vehicle route for the current drive cycle, and a current vehicle location relative to the route. In addition, the mapping and localization module 36 generates a vehicle location output 40. The vehicle location output 40 includes the current vehicle location relative to the route, and is used in a separate calculation as will be discussed below.

The primary control system 30 additionally includes a path planning module 42 for determining a vehicle path to be followed to maintain the vehicle on the desired route while obeying traffic laws and avoiding any detected obstacles. The path planning module 42 employs a first obstacle avoidance algorithm configured to avoid any detected obstacles in the vicinity of the vehicle, a first lane keeping algorithm configured to maintain the vehicle in a current traffic lane, and a first route keeping algorithm configured to maintain the vehicle on the desired route. The path planning module 42 is configured to receive the sensor fusion output 34 and the mapping and localization output 38. The path planning module 42 processes and synthesizes the sensor fusion output 34 and the mapping and localization output 38, and generates a path planning output 44. The path planning output 44 includes a commanded vehicle path based on the vehicle route, vehicle location relative to the route, location and orientation of traffic lanes, and the presence and path of any detected obstacles.

The primary control system 30 further includes a vehicle control module 46 for issuing control commands to vehicle actuators. The vehicle control module employs a first path algorithm for calculating a vehicle path resulting from a given set of actuator settings. The vehicle control module 46 is configured to receive the path planning output 44. The vehicle control module 46 processes the path planning output 44 and generates a vehicle control output 48. The vehicle control output 48 includes a set of actuator commands to achieve the commanded path from the vehicle control module 46, including but not limited to a steering command, a shift command, a throttle command, and a brake command.

The vehicle control output 48 is communicated to actuators 50. In an exemplary embodiment, the actuators 50 include a steering control, a shifter control, a throttle control, and a brake control. The steering control may, for example, control a steering system 18 as illustrated in FIG. 1. The shifter control may, for example, control a transmission 14 as illustrated in FIG. 1. The throttle control may, for example, control a propulsion system 12 as illustrated in FIG. 1. The brake control may, for example, control wheel brakes 20 as illustrated in FIG. 1.

In addition to the primary control system 30, the ADS 24' also includes at least one orthogonal co-pilot system 52. The orthogonal co-pilot system 52 is configured to verify and, if necessary, override the operation of the primary control system 30 using distinct algorithms from those employed in the primary control system 30.

The orthogonal co-pilot system 52 includes a path calculation module 54. The path calculation module 54 is configured to receive the vehicle location output 40 and the vehicle control output 48. The path calculation module 54 processes and synthesizes the vehicle location output 40 and the vehicle control output 48, and generates a path calculation output 58. The path calculation output 58 includes a first predicted path based on the path planning output 44 and a second predicted path based on current actuator settings in the absence of the path planning output 44. The path calculation module 54 includes a vehicle model 56 and employs a second path algorithm, which are distinct from the first path algorithm used in the vehicle control module 46.

The orthogonal co-pilot system 52 also includes an obstacle avoidance verification module 60. The obstacle avoidance verification module 60 is provided to verify that the vehicle 10 maintains a desired distance from any detected obstacles, such as other vehicles and/or roadside objects. The obstacle avoidance verification module 60 is configured to receive the path calculation output 58 and the sensor fusion output 34. The obstacle avoidance verification module 60 processes and synthesizes the path calculation output 58 and the sensor fusion output 34 and generates an obstacle avoidance verification output 62. The obstacle avoidance verification output 62 may include a Boolean true/false signal or other appropriate signal indicating the presence or absence of an obstacle in the first predicted path and/or in the second predicted path. The obstacle avoidance verification module 60 employs a second obstacle avoidance algorithm, which is distinct from the first obstacle avoidance algorithm used in the path planning module 42.

The orthogonal co-pilot system 52 additionally includes a lane keeping verification module 64. The lane keeping verification module 64 is provided to maintain the vehicle in a desired traffic lane. The lane keeping verification module 64 is configured to receive the path calculation output 58 and the sensor fusion output 34. The lane keeping verification module 64 processes and synthesizes the path calculation output 58 and the sensor fusion output 34 and generates a lane keeping verification output 66. The lane keeping verification output 66 may include a Boolean true/false signal or other appropriate signal indicating whether the first predicted path and/or the second predicted path would maintain the vehicle in a current traffic lane. The lane keeping verification module 64 employs a second lane keeping algorithm, which is distinct from the first lane keeping algorithm used in the path planning module 42.

The orthogonal co-pilot system 52 further includes a route keeping verification module 68. The route keeping verification module 68 is provided to maintain the vehicle on a desired route and within an authorized operating environment. The route keeping verification module 68 is configured to receive the path calculation output 58 and the mapping and localization output 38. The route keeping verification module 68 processes and synthesizes the path calculation output 58 and the mapping and localization output 38 and generates a route keeping verification output 70. The route keeping verification output 70 may include a Boolean true/false signal or other appropriate signal indicating whether the first predicted path and/or the second predicted path would maintain the vehicle on the route for the current drive cycle. The route keeping verification module 68 employs a second route keeping algorithm, which is distinct from the first route keeping algorithm used in the path planning module 42.

The orthogonal co-pilot system 52 further includes an arbitration module 72. The arbitration module 72 is configured to receive the obstacle avoidance verification output 62, the lane keeping verification output 66, and the route keeping verification output 70. The arbitration module processes and synthesizes the obstacle avoidance verification output 62, the lane keeping verification output 66, and the route keeping verification output 70, and outputs an orthogonal control output 74. The orthogonal control output 74 may include a signal to accept the vehicle control output 48, a signal to modify the vehicle control output 48, or a signal to reject the vehicle control output 48.

By providing the orthogonal co-pilot system 52 with algorithms distinct from those employed in the primary control system 30, the commanded path and actuator control signals may be validated independently from any software diagnostic conditions arising in the primary control system 30.

Figure 3:
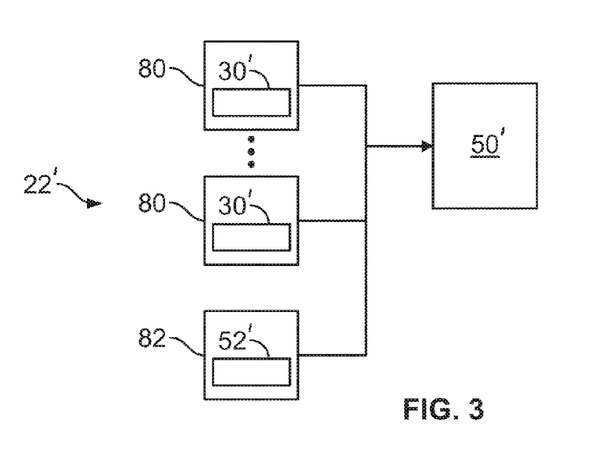
FIG. 3 is a schematic representation of a second embodiment of a system for controlling a vehicle according to the present disclosure.

Referring now to FIG. 3, an exemplary architecture for a controller 22' according to the present disclosure is illustrated schematically. The controller 22' includes at least one primary microprocessor 80 and associated non-transient data storage provided with a primary control system 30', which may be configured generally similarly to the primary control system 30 illustrated in FIG. 2. In the exemplary embodiment of FIG. 3, multiple primary microprocessors 80 are provided, each with associated non-transient data storage having a primary control system 30'. In addition, at least one orthogonal microprocessor 82 is provided, distinct from the one or more primary microprocessors 80. The orthogonal microprocessor 82 is provided with associated non-transient data storage having an orthogonal co-pilot system 52', which may be configured generally similarly to the orthogonal co-pilot system 52 illustrated in FIG. 2. Vehicle actuators 50' are under the collective control of the one or more primary microprocessors 80 and the at least one orthogonal microprocessor 82.

By providing the orthogonal co-pilot system 52' on a distinct hardware from that of the primary control system 30', the commanded path and actuator control signals may be validated independently from any hardware diagnostic conditions arising in the one or more primary microprocessors 80.

Figure 4:
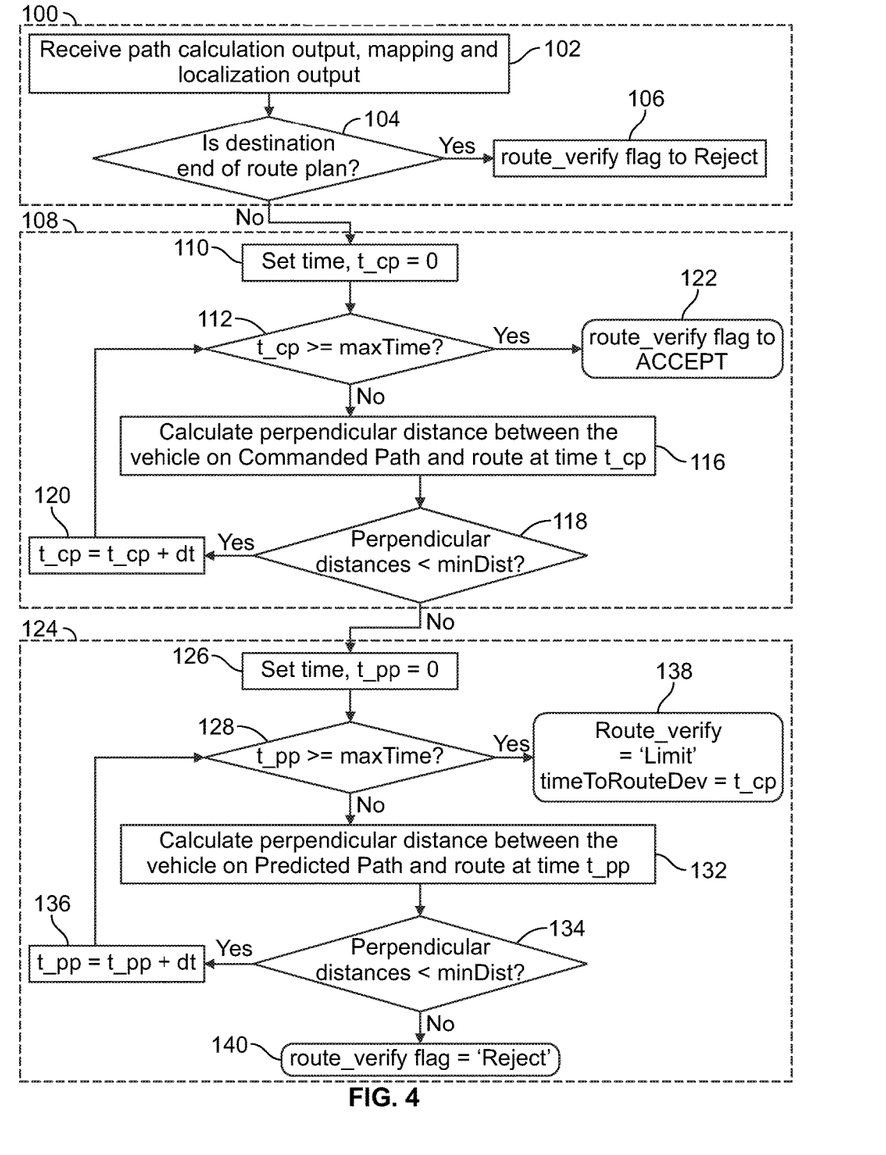
FIG. 4 is a flowchart representation of a method for controlling a vehicle according to the present disclosure.

Referring now to FIG. 4, an exemplary embodiment of a route verification algorithm, e.g. as may be used in the route keeping verification module 68, is illustrated in flowchart form.

The algorithm begins with an initialization phase 100. Path calculation output and mapping and localization output are received, as illustrated at block 102. As discussed above, path calculation output includes a first predicted path based on the path planning output and a second predicted path based on current actuator settings in the absence of the path planning output, while mapping and localization output may include various calculated parameters including, but not limited to, a vehicle route for the current drive cycle, and a current vehicle location relative to the route.

A determination is made of whether the current route terminates at a destination desired by an operator, as illustrated at operation 104. Here, the current route refers to a planned series of road segments connecting a current vehicle location to a final destination for the current drive cycle. If the determination is negative, i.e. the current route does not terminate at the desired destination, a route_verify flag is set to REJECT, as illustrated at block 106. Setting the route_verify flag to REJECT indicates that the route verification algorithm has determined that both the predicted path based on current actuator settings and the predicted path based on the path planning output would result in a deviation from the route, that the route does not terminate at the desired destination for the current drive cycle, or both. In response to the route_verify flag being set to REJECT, the orthogonal copilot system 52 may command the actuators 50 to reject the vehicle control output 48 and to instead perform an alternative maneuver. The alternative maneuver may include, for example, a fallback command to safely stop the vehicle. Such maneuvers may be referred to as minimal risk condition maneuvers.

If the determination of operation 104 is positive, control then proceeds to a commanded path evaluation phase 108. In the commanded path evaluation phase 108, the first predicted path based on the path planning output is evaluated to verify that the path planning output would not result in the host vehicle deviating from the vehicle route for the current drive cycle.

A first time counter t_cp is initialized to zero, as illustrated at block 110. As will be discussed in further detail below, the first time counter t_cp corresponds to a temporal window for prediction of vehicle and obstacle locations relative to a predicted path based on commanded actuator settings.

A determination is made of whether t_cp is greater than or equal to a maximum evaluation time maxTime, as illustrated at operation 112. The maximum evaluation time maxTime is a calibratable time period corresponding to a desired time window for prediction.

If the determination of operation 112 is negative, i.e. t_cp is less than maxTime, then perpendicular distances between the vehicle on the predicted path and the route are then calculated, as illustrated in block 116. Here, a perpendicular distance between the vehicle and the route refers to a lateral distance between a midline of the vehicle and the current road segment of the route.

A determination is made of whether the perpendicular distance calculated at block 116 is less than an evaluation distance minDist, as illustrated at operation 118. The evaluation distance minDist is a calibratable parameter corresponding to a range of possible host vehicle locations at time t_cp, based on a confidence level in the predicted path. In an exemplary embodiment, minDist is calibrated to increase as t_cp increases, along with t_pp discussed below. Thus, for shorter-term predictions a smaller range is evaluated, while for longer-term predictions a larger range is evaluated.

If the determination of operation 118 is positive, i.e. the perpendicular distance is less than minDist, then t_cp is incremented by a calibratable time increment dt, as illustrated at block 120. Control then returns to operation 112.

Returning to operation 112, if the determination of operation 112 is positive, i.e. t_cp is equal to or greater than maxTime, then a route_verify flag is set to ACCEPT, as illustrated at block 122. Setting the route_verify flag to ACCEPT indicates that the route verification algorithm has determined that the predicted path based on the path planning output would not result in the vehicle deviating from the desired route by a margin of minDist within the time interval maxTime. In response to the route_verify flag being set to ACCEPT, the orthogonal copilot system 52 may command the actuators 50 to accept the vehicle control output 48.

Returning to operation 118, if the determination of operation 118 is negative, i.e. the perpendicular distance is equal to or exceeds the evaluation distance minDist, then control proceeds to block 126.

A second time counter t_pp is initialized to zero, as illustrated at block 126. As will be discussed in further detail below, the second time counter t_pp corresponds to a temporal window for prediction of vehicle locations relative to a predicted vehicle path based on current actuator settings.

A determination is made of whether t_pp is greater than or equal to the maximum evaluation time maxTime, as illustrated at operation 128. As discussed above, the maximum evaluation time maxTime is a calibratable time period corresponding to a desired time window for prediction.

If the determination of operation 128 is negative, i.e. t_pp is less than maxTime, then perpendicular distances between the vehicle on the predicted path and the route are then calculated, as illustrated in block 132. As discussed above, the perpendicular distances refer to lateral distances between a midline of the vehicle and a current road segment on the route.

A determination is made of whether the perpendicular distance calculated at block 132 is less than the evaluation distance minDist, as illustrated at operation 134. As discussed above, the evaluation distance minDist is a calibratable parameter corresponding to a range of possible locations, based on a confidence level in the predicted path. As discussed above, in an exemplary embodiment, minDist is calibrated to increase as t_pp increases.

If the determination of operation 134 is positive, i.e. the perpendicular distance is less than minDist, then t_pp is incremented by the calibratable time increment dt, as illustrated at block 136. Control then returns to operation 128.

Returning to operation 128, if the determination of operation 128 is positive, i.e. t_pp is greater than or equal to maxTime, then the route_verify flag is set to LIMIT, as illustrated at block 138. Setting the route_verify flag to LIMIT indicates that the route verification algorithm has determined that the predicted path based on current actuator settings would not result in the vehicle deviating from the desired route by a margin of minDist within the time interval maxTime. In response to the route_verify flag being set to LIMIT, the orthogonal copilot system 52 may command the actuators 50 to modify the vehicle control output 48 to maintain current actuator settings. In an alternative embodiment, the orthogonal copilot system 52 may command the actuators 50 to modify the vehicle control output 48 to an intermediate value between the current actuator settings and the vehicle control output 48. In addition, a flag TimeToRouteDev is set to t_cp, as also illustrated at block 138. The TimeToRouteDev flag indicates a predicted time interval before the host vehicle deviates from the desired route.

Returning to operation 134, if the determination of operation 134 is negative, i.e. the perpendicular distance is equal to or greater than minDist, then the route_verify flag is set to REJECT, as illustrated at block 140. Setting the route_verify flag to REJECT indicates that the route verification algorithm has determined that both the predicted path based on current actuator settings and the predicted path based on the path planning output would result in the host vehicle deviating from the desired route by a margin equal to or greater than minDist. In response to the route_verify flag being set to REJECT, the orthogonal copilot system 52 may command the actuators 50 to reject the vehicle control output 48 and to instead perform an alternative maneuver. The alternative maneuver may include, for example, a fallback command to safely stop the vehicle. Such maneuvers may be referred to as minimal risk condition maneuvers.

As may be seen, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
    a vehicle steering system;
    an actuator configured to control the steering system;
    a second actuator configured to control a vehicle throttle;
    a third actuator configured to control vehicle brakes;
    a fourth actuator configured to control vehicle shifting;
    a first controller in communication with the actuator, the second actuator, the third actuator, and the fourth actuator, the first controller being programmed with a primary automated driving system control algorithm and configured to communicate an actuator control signal based on the primary automated driving system control algorithm; and
    a second controller in communication with the actuator, the second actuator, the third actuator, the fourth actuator, and with the first controller, the second controller being configured to predict a first predicted vehicle path based on the actuator control signal and, in response to the first predicted vehicle path deviating from a desired route by a threshold distance, control the actuator to maintain a current actuator setting, and in response to the first predicted vehicle path not deviating from the desired route by the threshold distance, control the actuator according to the actuator control signal.

2. The automotive vehicle of claim 1, wherein the second controller is further configured to predict a second predicted vehicle path based on the current actuator setting and, in response to the second predicted vehicle path deviating from the desired route by the threshold distance, control the actuator based on a fallback command.

3. The automotive vehicle of claim 2, wherein the second controller is configured to predict a first perpendicular distance between the desired route and the first predicted vehicle path and to predict a second perpendicular distance between the desired route and the second predicted vehicle path.

4. The automotive vehicle of claim 1, wherein the second controller is configured to predict the first vehicle path based on the actuator control signal in response to the actuator control signal.

5. The automotive vehicle of claim 1, wherein the first controller is associated with a first processor and the second controller is associated with a second processor.

6. A method of controlling a vehicle, comprising:
    providing the vehicle with an actuator configured to control vehicle steering, throttle, braking, or shifting;
    providing the vehicle with a first controller in communication with the actuator and having a primary automated driving system control algorithm;
    providing the vehicle with a second controller in communication with the actuator and the first controller;
    communicating, from the first controller, an actuator control signal based on the primary automated driving system control algorithm;
    predicting, by the second controller, a first predicted vehicle path based on the actuator control signal;
    in response to the first predicted vehicle path not deviating from the desired route by a threshold distance, controlling the actuator based on the actuator control signal; and
    in response to the first predicted vehicle path deviating from a desired route by the threshold distance, controlling the actuator to maintain a current actuator setting.

7. The method of claim 6, further comprising:
    predicting, by the second controller, a second predicted vehicle path based on the current actuator setting; and
    in response to the second predicted vehicle path deviating from the desired route by the threshold distance, controlling the actuator based on a fallback command.

8. The method of claim 7, further comprising:
    predicting, by the second controller, a first perpendicular distance between the desired route and the first predicted vehicle path; and
    predicting, by the second controller, a second perpendicular distance between the desired route and the second predicted vehicle path.

9. A system for autonomous control of a vehicle, comprising:
    an actuator configured to control vehicle steering, throttle, braking, or shifting;
    a first controller programmed to communicate an actuator control signal to the actuator based on a primary automated driving system control algorithm; and
    a second controller in communication with the actuator and with the first controller, the second controller being configured to, in response to a first predicted vehicle path based on the actuator control signal deviating from a desired route by a threshold distance, control the actuator to maintain a current actuator setting, wherein the second controller is configured to predict the first vehicle path based on the actuator control signal in response to the actuator control signal.

10. The system of claim 9, wherein the second controller is further configured to, in response to a second predicted vehicle path based on the current actuator setting deviating from the desired route by the threshold distance, control the actuator based on a fallback command.

11. The system of claim 10, wherein the second controller is configured to predict a first perpendicular distance between the desired route and the first predicted vehicle path and to predict a second perpendicular distance between the desired route and the second predicted vehicle path.

12. The system of claim 9, wherein the first controller is associated with a first processor and the second controller is associated with a second processor.

13. The system of claim 9, wherein the actuator is configured to control vehicle steering, wherein the system further includes a second actuator configured to control a vehicle throttle, a third actuator configured to control vehicle brakes, and a fourth actuator configured to control vehicle shifting, and wherein the first controller and second controller are additionally in communication with the second actuator, third actuator, and fourth actuator.

* * * * *